March 24, 1953 K. SCHLESINGER 2,632,800

NOISE SQUELCH SYSTEM FOR TELEVISION RECEIVERS

Filed March 26, 1949

Inventor
Kurt Schlesinger

By Foorman L. Mueller

Atty.

Patented Mar. 24, 1953

2,632,800

UNITED STATES PATENT OFFICE 2,632,800

NOISE SQUELCH SYSTEM FOR TELEVISION RECEIVERS

Kurt Schlesinger, Maywood, Ill., assignor to Motorola, Inc., Chicago, Ill., a corporation of Illinois Application March 26, 1949, Serial No. 83,636

6 Claims. (Cl. 178—5.8)

Figures 1, 2:
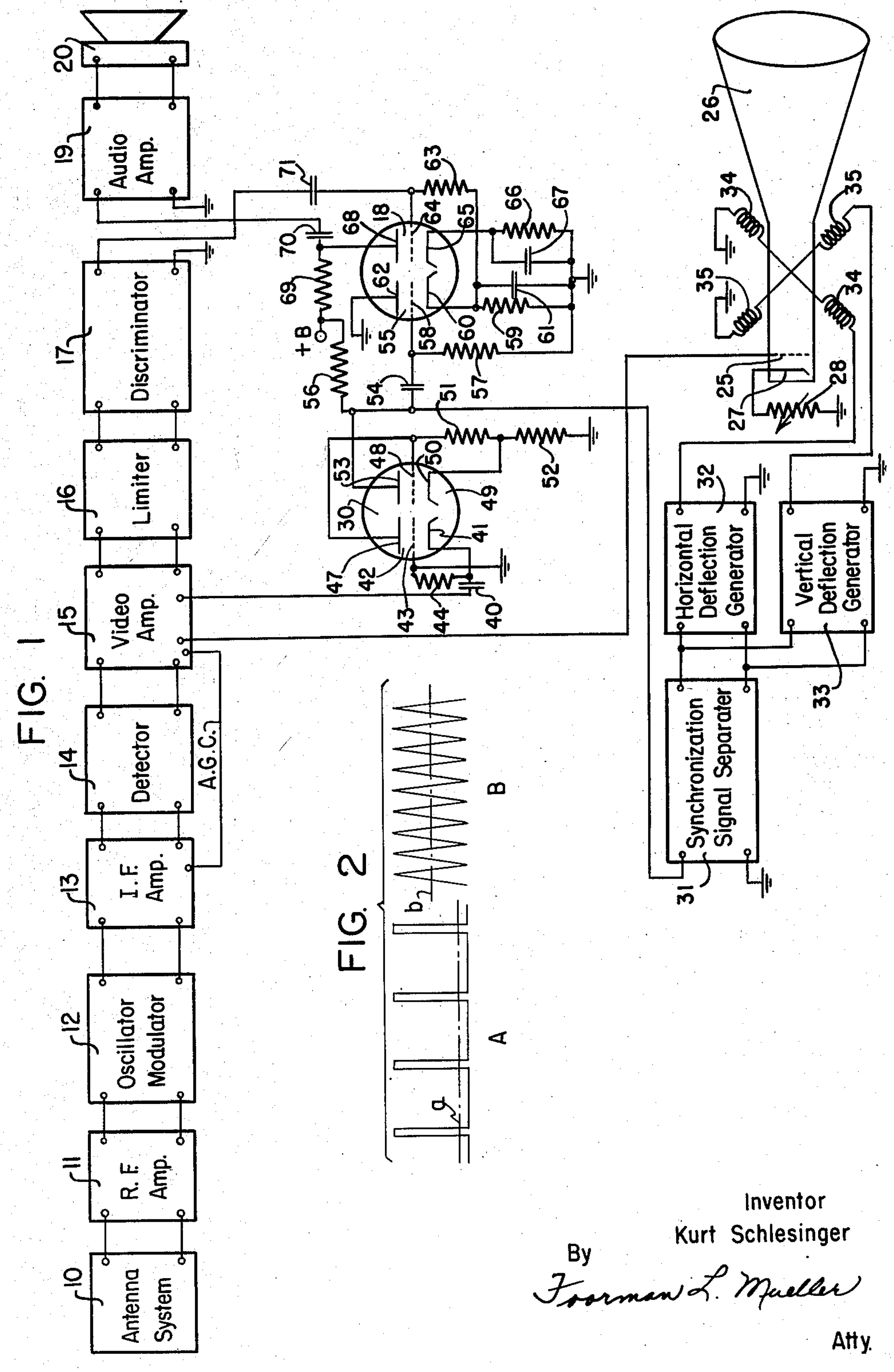

This invention relates generally to squelch systems and more particularly to a squelch system for preventing reproduction of noise normally produced by a television received in the absence of a television signal.

Many television receivers are highly selective and provide very high gain. This gain is controlled by automatic gain control circuits which control the amplification in accordance with the strength of the signal received. Such very high gain operates in the absence of a received television signal to cause very high amplification of noise signals picked up by the antenna of the television receiver and/or produced within the receiver itself. Noise voltages will be produced by the amplifying circuits for both sound and video signals if separate amplifiers are used, or by a common amplifying system for both sound and video signals. Reproduction of the noise voltages by the sound reproducing means of the television receiver will produce sounds which are very irritating to anyone close to the receiver.

It will be apparent from the above that undesirable noises are produced by the sound reproducing means of a television receiver when the receiver is being tuned or switched from station to station. When a signal is being received, the automatic gain control will cut down the amplification to the required level for providing satisfactory signals for the sound and picture reproducing means. However, in switching from one station to another, there will be an interval in which no signal is received and during this interval the gain control circuit will cause the amplifiers to provide very high gain. Such high gain amplification will produce a blast of noise, as mentioned above. This noise will cease, of course, when the signal of the station selected is received and the automatic gain control reduces the amplification. However, such a blast of noise even for a short duration of time is very undesirable. This is particularly true in high quality receivers as the gain is greater in such receivers and the noise is particularly objectionable.

It is, therefore, an object of the present invention to provide a system for eliminating the reproduction of noise in a television receiver during station selection.

A further object is to provide a simple system for distinguishing between video signals and noise signals and for rendering the sound reproducing means of a receiver operative only when video signals are received.

A feature of this invention is the provision of a control system for the audio amplifier of a television receiver for providing a bias to the amplifier for rendering the same operative only when a television signal is received.

A further feature of this invention is the provision of a television receiver including a wave form discriminator operating from the output of the synchronization signal clipper for producing a bias which depends on the wave form, and applying the bias to a normally cut off audio amplifier for rendering the amplifier conducting when a television signal is received.

A still further feature of this invention is to provision of a television receiver including a squelch system having a rectifier coupled to the output of a double clipper circuit which produces a voltage in accordance with the positive peaks of the output wave of the clipper. Because of the wave form of the synchronization signals which are produced by the clipper and the wave form of noise pulses which are produced in the absence of a television signal, the voltage from the rectifier is greater for television signals than for noise signals. The voltage from the rectifier is applied to the sound amplifier which is normally biased off and renders the amplifier operative when television signals are received.

Further objects, features and advantages will be apparent from a consideration of the following description taken in connection with the accompanying drawings in which:

Fig. 1 illustrates a television receiver including the squelch system in accordance with the invention; and Fig. 2 shows curves which illustrate the operation of the squelch system.

In practicing the invention, a television receiver of generally standard construction is provided which has an automatic gain control system for controlling the amplification of the receiver in accordance with the intensity of the signal received. A synchronization signal clipper of the double clipping type is provided which produces an output wave having a constant overall amplitude. The clipper will, therefore, provide double clipped synchronization pulses when a television signal is received and will produce a noise output having the same overall amplitude in the absence of a television signal. The synchronization pulses are of such duration and so spaced that the amplitude of the positive peaks of the wave with respect to the alternating current axis is substantially equal to the overall amplitude of the output wave. The noise signals on the other hand, have such a distribution that the positive and negative peaks are substantially equal and the positive peaks cannot have a value greater than about one half the overall amplitude of the output wave. The output from the clipper is applied to a rectifier which produces a voltage corresponding to the positive peaks and which, therefore, produces a voltage of greater magnitude when a television signal is received than when noise output is produced by the clipper. The voltage from the rectifier is applied to a stage of the sound amplifier of the television receiver which is normally biased off. The greater voltage produced by the television signal is sufficient to render the amplifier conducting, whereas the voltage produced by noise is not sufficient to overcome the blocking bias.

Referring now more particularly to the drawings, in Fig. 1 the television receiver is illustrated with the standard components shown in block diagram and the components constructed in accordance with the invention illustrated by complete circuit diagrams. The television receiver includes an antenna system 10 for intercepting television signals which include both sound signals and composite video signals. These signals are amplified and selected in radio frequency amplifier 11 and thereafter reduced to intermediate frequency by the oscillator modulator 12. A single intermediate frequency amplifier 13 is illustrated for amplifying both the sound and video signals in what is generally referred to as an intercarrier sound system. However, it is to be pointed out that separate sound and video amplifiers may be provided in a well known manner. The video signals and the intercarrier sound signals are then derived from the intermediate frequency signals by detector 14 and are further amplified by the video amplifier 15. The video amplifier may include means for separating the sound and video signals for application to the sound and video reproducing means. An automatic gain control circuit is provided in the receiver for controlling the gain thereof in accordance with the signal strength. This circuit may be of well known construction and may include a coupling from either the detector 14 or the video amplifier 15 to the intermediate frequency amplifier 13 and/or the radio frequency amplifier 11.

The signals derived from the video amplifier 15 are applied to the sound limiter 16 and then to discriminator 17. The discriminator produces an audio output from the frequency modulated intercarrier wave. The audio output from discriminator 17 is applied to the triode 18 which functions as the first stage of audio amplification. The output from the triode 18 is then applied to the audio amplifier 19 which provides audio signals of sufficient amplitude for operating sound reproducing device 20 which may be a standard loudspeaker.

As is well known, the video signals provided by the video amplifier 15 include picture elements and synchronization pulses. The video signal is applied to the grid 25 of cathode ray tube 26 for modulating the beam of the tube so that the picture elements are reproduced by the beam as light or dark spots on the screen of the tube. The cathode 27 of the tube may be grounded through a variable resistor 28 which provides the brightness control for the picture produced on the screen of the cathode ray tube. The synchronization signals must be derived from the composite video signal for controlling the deflection generators which cause the beam of the cathode ray tube to scan the screen to form a picture pattern. This is accomplished by a clipper circuit including the double triode tube 30. The output from the clipper is then applied to synchronization signal separator 31 which separates the horizontal synchronization pulses from the vertical synchronization pulses. The horizontal pulses are applied to the horizontal deflection generator 32 and the vertical pulses are applied to the vertical deflection generator 33 for synchronizing these generators. These generators are shown connected to horizontal deflection coils 34 and vertical deflection coils 35 and are arranged to provide sawtooth currents for the coils in a well known manner. It is to be pointed out, however, that the system of the invention is not limited to television receivers having electromagnetic deflection, and electrostatic tubes having the plates thereof connected to sawtooth voltage generators for producing horizontal and vertical deflection would operate equally well.

Considering now the novel part of applicant's invention, the automatic gain control circuit will control the gain of the receiver so that the signals produced by the video amplifier will tend to rise to a predetermined signal level. This level will be adjusted so that the sound and video signals will be at the proper levels for satisfactory reproduction thereof. However, in the absence of a television signal, the gain control will cause the amplification to be increased until signals are produced which are of said predetermined value. These signals will in this case be noise signals which are either picked up by the antenna or which originate in the receiver itself. These noise signals will be further amplified in the sound channel and will produce noise sounds in the sound reproducing means. The noise signals may also cause modulation of the beam of the cathode ray tube but this effect will be less objectionable than the noise sounds reproduced by the speaker of the television receiver.

To eliminate the reproduction of noise when no television signal is being received, a squelch circuit is provided which cuts off the audio amplifier stage 18 when a television signal is not being received. This squelch circuit is in effect a wave form discriminator coupled to the output of the clipper circuit. The clipper circuit clips the synchronization pulses from the video signal and then inverts the pulses and clips the tips therefrom to remove noise. Such double clipping action provides an output wave from the clipper having constant overall amplitude. Various clipper circuits are available which produce this function and the invention is not limited to the particular clipper circuit illustrated. When a television signal is being received, the output of the clipper circuit includes the synchronization pulses and the wave form will be as illustrated at A in Fig. 2. The synchronization pulses are of short duration and occur at a time interval so that the pulses are present only about one tenth of the total time or less. The alternating current axis of the pulses, therefore, is at a level of the order of one tenth of the total overall amplitude of the output wave from the clipper. This is illustrated by the dot-dash line *a*. When no television signal is being received, the clipper circuit produces an output wave of noise pulses which are of the same overall amplitude as the synchronization pulses but which are of random distribution. This is illustrated in curve B of Fig. 2. The alternating current axis of the noise pulses is, therefore, at a level of the order of one half of the overall amplitude of the output wave from the clipper.

The output wave from the clipper is applied to a rectifier which rectifies the positive peaks of the signals applied thereto. As the positive peaks of the synchronization pulses with respect to the alternating current axis of the output wave is much greater than the positive peaks of the noise pulses with respect to their alternating current axis, the output voltage of the rectifier will be greater when synchronization signals are applied than when noise signals are applied. The output of the rectifier is applied to the grid of the triode which functions as the first stage of the audio amplifier. The cathode of the triode is held at a positive value sufficiently high that the triode is blocked when the voltage produced by noise is applied to the grid but is rendered conducting when the voltage produced by synchronization signals is applied to the grid. Considering a specific example, the overall output wave of the clipper may be of the order of 40 volts. The positive peaks of the synchronization signal output from the clipper will then be of the order of 36 volts. The positive peaks when noise signals are produced by the clipper will be of the order of 20 volts. If the cathode of the amplifier is held at a potential of the order of 30 volts, the tube will stay blocked when the 20 volt bias from noise signals is applied to the grid of the triode amplifier. However, when the bias of 36 volts produced by synchronization signals is applied to the triode the grid will be more positive than the cathode and the tube will conduct. The ratio of positive bias produced by a video signal to the bias produced by noise of 1.8 or more results from the particular wave forms and not from the automatic gain control action. The clipper is saturated and will produce a constant output amplitude.

Considering now the circuit more in detail, the video signal is applied through coupling condenser 40 to the cathode 41 of the first triode section 42 of the double triode 30. The grid 43 of this triode is self-biased with respect to the cathode by resistor 44. Such bias is provided that current flows only when signals of large negative amplitude are applied so that the triode 42 clips the synchronization pulses from the composite video signal. These pulses are applied in the same polarity from the plate 47 of the triode 42 to the grid 48 of the triode 49. The grid 48 is biased with respect to the cathode 50 by resistor 51, and the cathode in turn is biased by resistor 52. The triode 49 serves as a second clipper stage to clip the noise from the peaks of the synchronization pulses. The clipped pulses are applied from the plate 53 of the triode 49 to the synchronization signal separator 31 and through condenser 54 to the triode 55 which functions as a rectifier. Positive potential is applied to the plate 53 through resistor 56 from the +B source of potential.

The condenser 54 and resistor 57 form a differentiating circuit which reduce the disruption by the vertical synchronization pulses, from the output of the clipper, as much as possible. The squelch action as previously described depends upon the horizontal synchronization pulses only. The vertical synchronization pulses introduce a buzz into the bias produced by the rectifier and therefore should preferably be eliminated. These pulses are reduced by the differentiating circuit in a well known manner. The triode 55 functions as a rectifier so that a voltage corresponding to the positive peaks of the signal applied to the grid 58 is developed across the load resistor 59 connected to the cathode 60. The resistor 59 is bridged by a condenser 61 to provide the desired time constant. The plate 62 of the triode is grounded so that the triode functions as a diode. The voltage appearing across the load resistor 59 of the rectifier is applied through resistor 63 to the grid 64 of the triode 18. The audio signal is also applied to the grid 64 of the triode 18, being applied thereto through coupling condenser 71. The condenser 71 isolates the on-off bias applied through resistor 63 and serves as a low pass filter to remove any buzz resulting from the vertical synchronization pulses. The cathode 65 of the triode 18 is biased by resistor 66 bypassed by condenser 67 which provide ample positive blocking potential on the cathode 65. The plate 68 of the triode 18 is connected to +B potential through resistor 69 and the amplified signal from the plate is applied to the audio amplifier 19 through coupling condenser 70.

The operation of the squelch circuit is therefore based on wave form discrimination and does not depend on the signal strength or the operation of the automatic gain control circuit. The output of the clipper is of constant overall amplitude. The rectifier, however, provides a direct current voltage in accordance with the positive peaks of the signal and, therefore, provides almost twice as much voltage from a television signal as from the noise pulses. This voltage is applied to the amplifier for counteracting the bias on the cathode thereof so that the tube will conduct. As previously stated, the difference in the voltage produced by television signals and that produced by noise is relatively large so that the system is not critical and the cathode bias can be established intermediate these two values and considerable variation thereof will not disrupt the system. In order to prevent overriding of the squelch bias by noise signals, the difference in the bias voltages should be of the order of ten times that of the signal voltage applied to the amplifier tube. It is also apparent that if the amplitude of the noise signals produced by the clipper is less than the predetermined maximum amplitude, the rectified voltage will be still less so that the audio amplifier will remain blocked. It is only when synchronization pulses are produced that saturate the clipper 49, that a sufficient voltage is developed in the rectifier to overcome the bias on the amplifier and cause the amplifier to conduct.

It is to be pointed out that the squelch circuit requires very little equipment not normally provided in a television receiver. The double triode 30 of the clipper circuit is a necessary element of the receiver and is used in the squelch system without modification. The audio amplifier 18 is also a necessary element. It is, therefore, apparent that only the tube section 55, which functions as a diode, and the associated coupling circuits are added to provide the squelch system. Although the tube section 55 is illustrated as a triode combined with the first audio amplifier triode, it is obvious that a diode will perform the function required. The squelch system as disclosed is not critical in operation as the control voltages produced by the synchronization signals and by noise are of substantially different magnitudes and, therefore, a clear "on" or "off" biasing action in the amplifier is provided without critical adjustment. The system has been satisfactorily constructed and has been highly satisfactory in removing the objectionable noise produced during station selection without interfering in any manner with the normal operation of the television receiver. In systems constructed the following values were used for the components of the squelch system:

| | |
|---|---|
| Condenser 54 | 200 micromicrofarads |
| Resistor 57 | 100,000 ohms |
| Triodes 18 and 55 | 6SL7 |
| Resistor 59 | 1.5 megohms |
| Condenser 61 | 0.1 microfarad |
| Resistor 63 | 4.7 megohms |
| Resistor 66 | 56,000 ohms |
| Condenser 67 | 0.1 microfarad |
| Condenser 71 | 0.02 microfarad |

Although these values are not critical and other values may be preferable in particular cases, these values have provided very satisfactory operation when operating with a clipper output of the order of 40 volts.

While there is described one embodiment of the invention which is illustrative thereof, it is obvious that various changes and modifications can be made therein without departing from the intended scope of the invention as defined in the appended claims.

I claim:

1. In a television receiver including means for amplifying and detecting audio and video signals which video signal includes picture elements and synchronization pulses having greater amplitude than the picture elements, the combination including, a stage for repeating the audio signals, clipper means for deriving a wave including said synchronization pulses from said video signal, said clipper means limiting both positive and negative peaks of the wave to provide a wave having fixed overall amplitude, rectifier means for providing a control voltage in accordance with the peak amplitude of a wave with respect to the alternating current axis thereof, alternating current coupling means connecting said clipper means to said rectifier means for applying said fixed amplitude wave thereto, with the amplitude of the peaks of the wave with respect to the alternating current axis thereof varying with the shape of the wave, control means for said repeating stage, means for applying said control voltage produced by said rectifier means to said control means, said control means selectively rendering said repeating stage operative when said control voltage exceeds a predetermined value.

2. In a television receiver including means for amplifying and detecting audio and video signals which video signal includes picture elements and line and field synchronization pulses having greater amplitude than the picture elements, and with the amplifying means producing noise signals in the absence of audio and video signals, an audio squelch system including in combination, a stage for repeating the audio signals, clipper means for deriving a wave from the amplified signals which wave includes the synchronization pulses when a video signal is received, said clipper means limiting both positive and negative peaks of the wave to provide a wave having fixed overall amplitude, rectifier means for providing a control voltage in accordance with the peak amplitude of a wave with respect to the alternating current axis thereof, alternating current coupling means connecting said clipper means to said rectifier means for applying said fixed amplitude wave thereto, with the amplitude of the peaks of the wave with respect to the alternating current axis thereof varying with the shape of the wave and being greater when a video signal is received than when noise signals only are received, said coupling means substantially eliminating said field synchronization pulses, control means for said repeating stage, and means for applying said control voltage produced by said rectifier means to said control means, said control means selectively rendering said repeating stage operative when said control voltage exceeds a predetermined value and causing said repeating stage to operate when a video signal is received and to be inoperative when noise signals only are received.

3. A television receiver including in combination, clipper means for deriving synchronization pulses from said video signal and for producing noise signals in the absence of a video signal, said clipper means producing an output wave having a substantially fixed overall amplitude, said output wave produced by noise signals being substantially symmetrical so that the amplitude of the peaks thereof with respect to the alternating current axis of said wave is of the order of one-half of said fixed overall amplitude, said output wave produced by synchronization pulses being unsymmetrical and having such form that the amplitude of the positive peaks thereof with respect to the alternating current axis of said wave is substantially greater than one-half of said fixed overall amplitude, rectifier means for producing a control voltage varying in accordance with the amplitude of the peaks of a wave with respect to the alternating current axis thereof, circuit means connecting said clipper means to said rectifier means providing an alternating current coupling for applying said output wave to said rectifier means, an amplifier for audio signals including an electron discharge valve having at least a cathode, a grid and a plate, means for applying a signal to said grid including the received audio signal and noise in the absence of a received audio signal, means for applying a positive potential to said cathode of said valve for rendering said amplifier inoperative, and means for applying the control voltage from said rectifier means to said grid of said valve with the control voltage produced by synchronization pulses being greater than said potential on said cathode, so that said amplifier is rendered conducting when a video signal is received.

4. A television receiver including in combination, clipper means for deriving synchronization pulses from said video signal and for producing noise signals in the absence of a video signal, said clipper means producing an output wave having a substantially fixed overall amplitude, said output wave produced by noise signals being substantially symmetrical so that the amplitude of the peaks thereof with respect to the alternating current axis of said wave is of the order of one-half of said fixed overall amplitude, said output wave produced by the synchronization pulses being unsymmetrical and having such form that the amplitude of the positive peaks thereof with respect to the alternating current axis of said wave is substantially greater than one-half of said fixed overall amplitude, rectifier means for producing a control voltage varying in accordance with the amplitude of the peaks of a wave with respect to the alternating current axis thereof, circuit means connecting said clipper means to said rectifier means providing an alternating current coupling for applying said output wave to said rectifier means, an amplifier for said audio signals including an electron discharge valve having at least a cathode, a grid and a plate, means for applying a signal to said grid including the received audio signal and noise in the absence of a received audio signal, means for applying a positive potential to said cathode of said valve for rendering said amplifier inoperative, said potential applied to said cathode being greater than said signals applied to said grid so that said amplifier is not rendered conducting by said signals alone, and means for applying the control voltage from said rectifier means to said grid of said valve with the control voltage produced by synchronization pulses being greater than said potential on said cathode, so that said amplifier is rendered conducting when a video signal is received.

5. A television receiver including in combination, clipper means for deriving horizontal and vertical synchronization pulses from a video signal and for producing noise signals in the absence of a video signal, said clipper means producing an output wave having a substantially fixed overall amplitude, differentiating means connected to said clipper means for eliminating the vertical synchronization pulses from said output wave, said output wave formed by horizontal synchronization pulses being unsymmetrical and having such form that the amplitude of the peaks thereof with respect to the alternating current axis of said wave is of the order of nine-tenths of said fixed overall amplitude, said output wave formed by noise signals being substantially symmetrical so that the amplitude of the peaks thereof with respect to the alternating current axis of said wave is of the order of one-half of said fixed overall amplitude, rectifier means for producing a control voltage varying in accordance with the amplitude of the peaks of an applied wave with respect to the alternating current axis thereof, alternating current coupling means connecting said differentiating means to said rectifier means for applying said output wave thereto, an amplifier for audio signals including an electron discharge valve having at least a cathode, a grid and a plate, means for applying a received audio signal to said grid and for applying noise thereto in the absence of a received audio signal, means for applying a positive potential to said cathode of said valve for rendering said amplifier inoperative, and means for applying said control voltage from said rectifier means to said grid of said valve with the voltage produced thereby from the horizontal synchronization pulses being greater than said potential on said cathode so that said amplifier is rendered conducting when a video signal is received.

6. A television receiver including in combination, clipper means for deriving horizontal and vertical synchronization pulses from a video signal and for producing noise siginals in the absence of a video signal, said clipper means producing an output wave having a substantially fixed overall voltage, differentiating means connected to said clipper means for eliminating the vertical synchronization pulses from said output wave, said output wave produced by horizontal synchronization pulses being unsymmetrical and having such form that the amplitude of the peaks thereof with respect to the alternating current axis of said wave is of the order of nine-tenths of said fixed overall voltage, said output wave formed by noise signals being substantially symmetrical so that the amplitude of the peaks thereof with respect to the alternating current axis of said wave is of the order of one-half of said fixed overall voltage, rectifier means for producing a control voltage varying in accordance with the amplitude of the peaks of an applied wave with respect to the alternating current axis thereof, alternating current coupling means connecting said differentiating means to said rectifier means for applying said output wave thereto, an amplifier for audio signals including an electron discharge valve having at least a cathode, a grid and a plate, means for applying a received audio signal to said grid and for applying noise thereto in the absence of a received audio signal, means for applying a positive potential to said cathode of said valve of the order of three-fourths of said fixed voltage for rendering said amplifier inoperative, and means for applying said control voltage from said rectifier means to said grid of said valve with the voltage produced thereby from the horizontal synchronization pulses being greater than said potential on said cathode so that said amplifier is rendered conducting when a video signal is received.

KURT SCHLESINGER.

REFERENCES CITED

The following references are of record in the file of this patent:

UNITED STATES PATENTS

| Number | Name | Date |
|---|---|---|
| 2,056,607 | Holmes | Oct. 6, 1936 |
| 2,173,173 | Lewis | Sept. 19, 1939 |
| 2,259,538 | Wheeler | Oct. 21, 1941 |
| 2,285,857 | Hewel | June 9, 1942 |
| 2,299,390 | Holmes | Oct. 20, 1942 |
| 2,448,908 | Parker | Sept. 19, 1948 |